United States Patent
Chang et al.

(10) Patent No.: US 10,967,798 B2
(45) Date of Patent: Apr. 6, 2021

(54) CONTROL DEVICE AND METHOD FOR IMAGE DISPLAY

(71) Applicant: Qisda Corporation, Taoyuan (TW)

(72) Inventors: Chih-Ming Chang, Taoyuan (TW); Chao-Shun Yu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/657,186

(22) Filed: Oct. 18, 2019

(65) Prior Publication Data

US 2020/0254933 A1 Aug. 13, 2020

(30) Foreign Application Priority Data

Feb. 12, 2019 (CN) .......................... 201910110720.6

(51) Int. Cl.
| | |
|---|---|
| *B60R 1/12* | (2006.01) |
| *H04N 5/232* | (2006.01) |
| *B60R 1/04* | (2006.01) |
| *G06F 3/0488* | (2013.01) |
| *G06F 3/0484* | (2013.01) |
| *G06T 7/70* | (2017.01) |
| *H04N 7/18* | (2006.01) |

(52) U.S. Cl.
CPC .................. *B60R 1/12* (2013.01); *B60R 1/04* (2013.01); *G06T 7/70* (2017.01); *H04N 5/23229* (2013.01); *H04N 7/183* (2013.01); *B60R 2300/303* (2013.01); *G06F 3/0484* (2013.01); *G06F 3/0488* (2013.01); *G06T 2207/30196* (2013.01); *G06T 2207/30268* (2013.01)

(58) Field of Classification Search
CPC ...... B60R 1/00; B60R 1/02; B60R 2300/8046
See application file for complete search history.

(56) References Cited

U.S. PATENT DOCUMENTS

| | | | |
|---|---|---|---|
| 7,370,983 B2* | 5/2008 | DeWind | B60K 35/00 359/844 |
| 8,154,418 B2* | 4/2012 | Peterson | G06F 3/0443 340/815.4 |
| 9,102,269 B2* | 8/2015 | Waite | B60R 1/00 |
| 2008/0158357 A1* | 7/2008 | Connell | H04N 7/183 348/148 |
| 2018/0065558 A1* | 3/2018 | Matsuyama | B60R 1/12 |
| 2018/0072227 A1* | 3/2018 | Kato | B60R 1/00 |
| 2018/0334102 A1* | 11/2018 | Zafeirakis | B60R 21/01552 |

* cited by examiner

*Primary Examiner* — Tung T Vo
*Assistant Examiner* — Kyle M Lotfi

(57) ABSTRACT

A control device and a method for image display are provided. The control device includes a mirror display unit, a backward camera unit, a reference data detection module, and an image processing module. The mirror display unit includes a mirror and a display module. The mirror generates a first image via reflection. The display module has a display surface at least partially overlapping with the mirror. The backward camera unit captures a second image, and the area of the first image is within the area of the second image. The reference data detection module generates reference data. The image processing module determines an area correspondence between the first image and the second image according to the reference data, and generates a display image from the second image based on the area correspondence. The display module displays the display image when receiving a switch command.

11 Claims, 11 Drawing Sheets

CONTROL DEVICE AND METHOD FOR IMAGE DISPLAY

BACKGROUND

Technical Field

The present invention relates to a control device and a method for image display. Specifically, the present invention relates to a control device for image display that is disposed on a vehicle and a method thereof.

Related Art

To ensure safety during driving, a driver needs to see what is coming behind through a rear-view mirror. However, a line of sight range of the rear-view mirror is insufficient to enable the driver to fully grasp a condition behind the driven vehicle. Therefore, many drivers choose to install various auxiliary mirrors or a rear-view camera at positions where the sight is reached as auxiliaries.

Despite installments of various auxiliary mirrors and the rear-view camera, the driver needs to frequently check images provided by the rear-view mirror and various auxiliary mirrors and the rear-view camera during driving, which is easy to cause distraction. The driver cannot accurately determine, based on displayed images at different angles and within different line of sight ranges, a distance and a relative position of a same object in each reference image in a timely manner so as to quickly make a response. In addition, mirror images of the rear-view mirror cannot be integrated with photographic images in the pictures captured by the camera, and the driver cannot perform image switching or even a further operation on the same display surface, causing inconvenience to image inspection and an image operation.

SUMMARY

An object of the present invention is to provide a control device for image display that is disposed on a vehicle, to integrate a mirror image with a photographic image and perform switching between the mirror image and the photographic image, so that a driver can accurately determine a condition of a rear vehicle to quickly make a response.

Another object of the present invention is to provide a control method for image display that is set in a vehicle, to generate a display image according to a relative position of a driver and integrate a mirror image with a photographic image, so that the driver can accurately determine a same object in a reference picture to quickly make a response.

A technical solution provided in the present invention is to provide a control device for image display. The control device for image display is disposed on a vehicle and includes a mirror display unit, a backward camera unit, and an image processing module. The mirror display unit includes a mirror and a display module. The mirror generates a first image via reflection. The display module has a display surface, and the display surface at least partially overlaps with the mirror. The backward camera unit is disposed on the mirror display unit and captures a second image, and the area of the first image is within the area of the second image. The image processing module determines a relative position of a driver based on content of the second image, determines an area correspondence between the first image and the second image based on the relative position of the driver, and generates a display image from the second image based on the area correspondence. The display module displays the display image when accepting a switch command.

Another technical solution provided in the present invention is to provide a control device for image display. The control device for image display is disposed on a vehicle and includes a mirror display unit, a backward camera unit, a reference data detection module and an image processing module. The mirror display unit includes a mirror and a display module. The mirror generates a first image via reflection. The display module has a display surface, and the display surface at least partially overlaps with the mirror. The backward camera unit captures a second image, where the area of the first image is within the area of the second image. The reference data detection module generates reference data. The image processing module determines an area correspondence between the first image and the second image according to the reference data, and generates a display image from the second image based on the area correspondence. The display module displays the display image when accepting a switch command.

A technical solution provided in the present invention is to provide a control method for image display, including the following steps: generating a first image via reflection by a mirror of a mirror display unit; capturing a second image by a backward camera unit; generating reference data by a reference data detection module; determining an area correspondence between the first image and the second image according to the reference data, and generating a display image from the second image based on the area correspondence by an image processing module; and driving, according to the switch command, a display module whose display surface at least partially overlaps with the mirror to display the display image.

BRIEF DESCRIPTION OF THE DRAWINGS

The accompanying drawings of the present invention are described as follows.

DETAILED DESCRIPTION

Figure 1A:
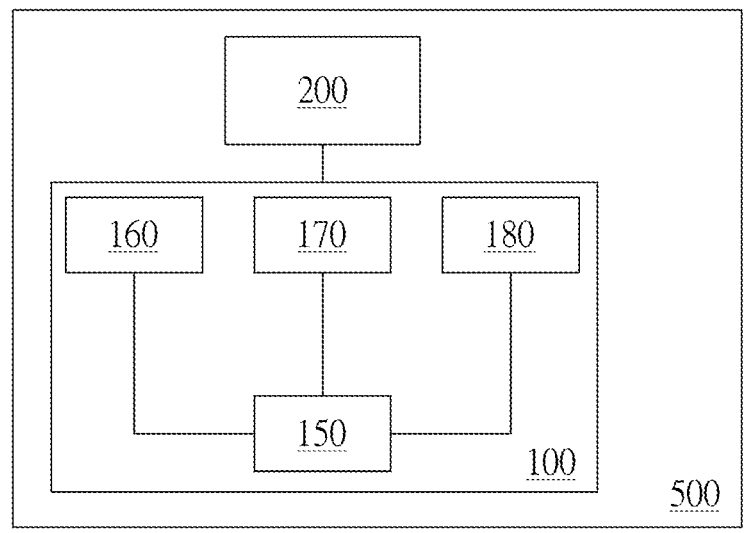
FIG. 1A is a system block diagram of an embodiment of a control device for image display.
Figure 1B:
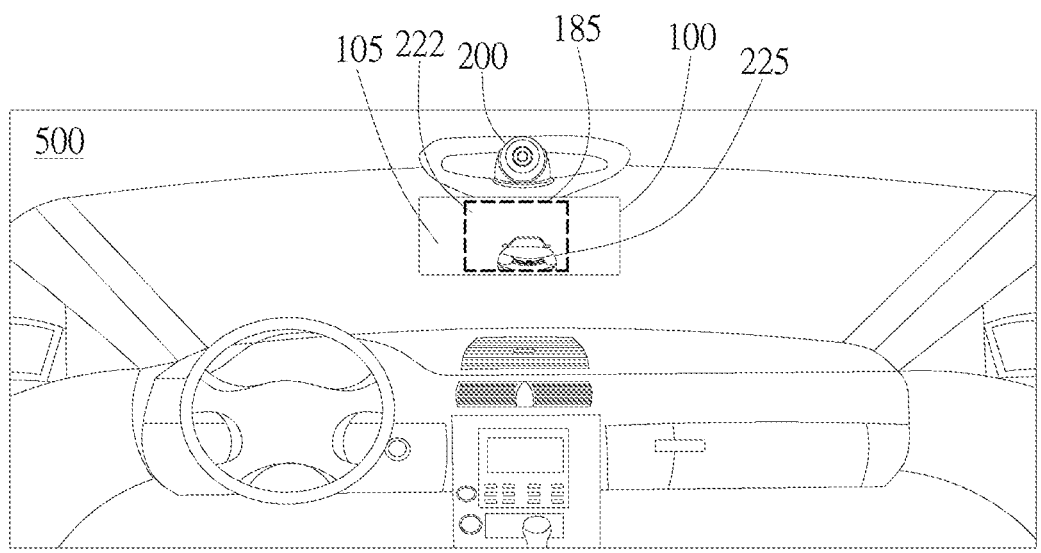
FIG. 1B is a schematic diagram of an embodiment of a control device for image display.

FIG. 1A is a system block diagram of an embodiment of a control device for image display. FIG. 1B is a schematic diagram of an embodiment of a control device for image display. As shown in FIG. 1A and FIG. 1B, a control device for image display is disposed on a vehicle 500. The control device includes a mirror display unit 100, a backward camera unit 200, and an image processing module 160. The mirror display unit 100 includes the image processing module 160, a switch detection unit 170, and a display module 180 that are separately coupled to a control module 150. As shown in FIG. 1B, the mirror display unit 100 includes a mirror 105 and a display surface 185. The display surface 185 displays a display image 222, and the display surface 185 at least partially overlaps with the mirror 105. In other words, the display surface 185 may fully overlap with the mirror 105. Preferably, the mirror display unit 100 is a rear-view mirror combined with a display screen in front of a driver. The display screen is located within the rear-view mirror and can display the display image 222. When the display screen does not display the display image 222, the mirror display unit 100 is simply a rear-view mirror in a vehicle that can reflect a rear image.

Figure 1C:
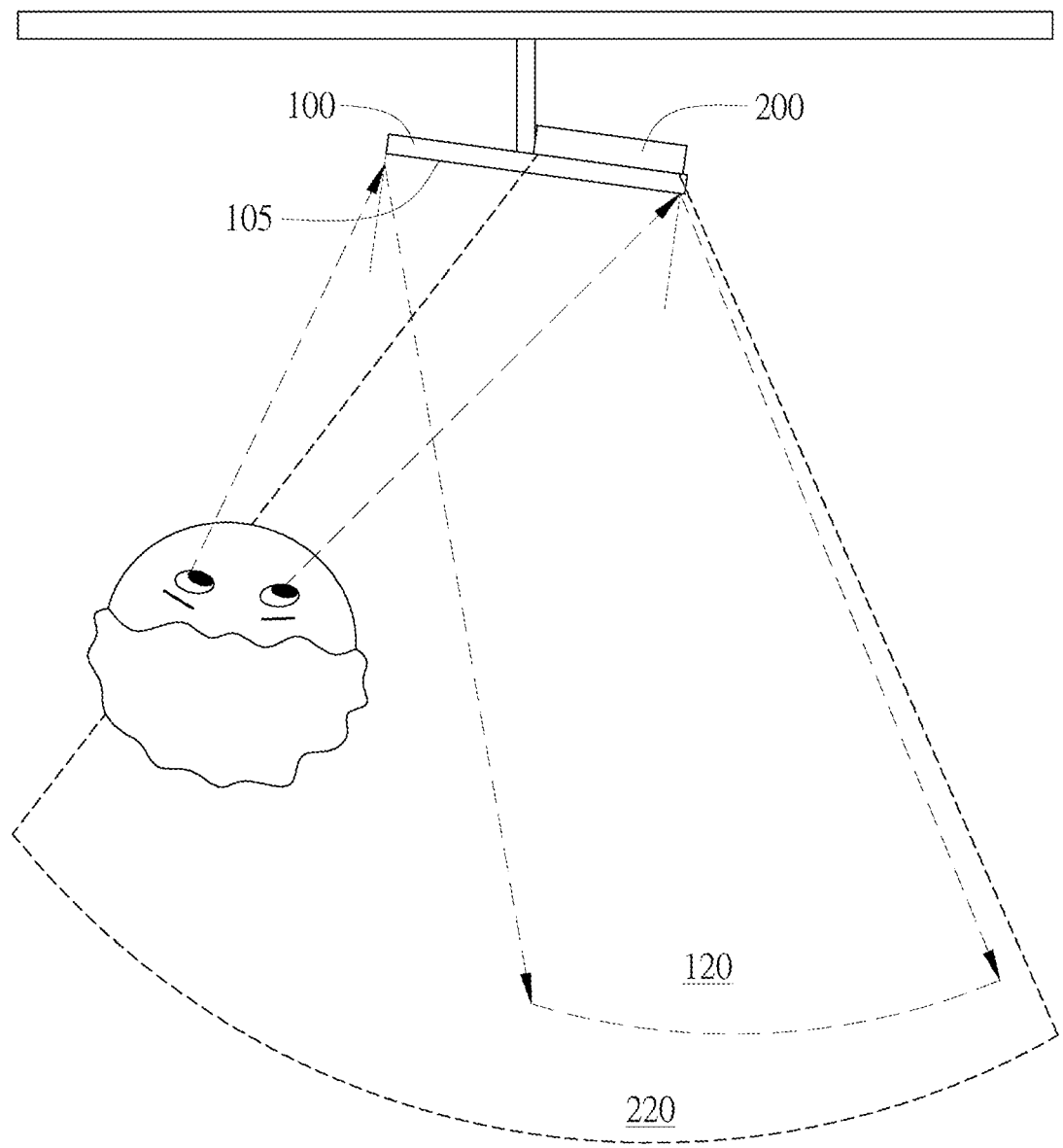
FIG. 1C is a schematic diagram of an embodiment of a control device for image display.
Figure 1D:
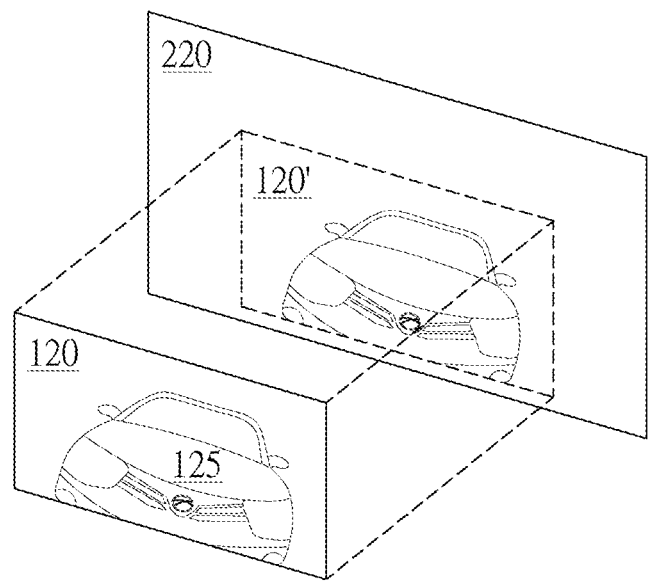
FIG. 1D is a schematic diagram of an embodiment of a control device for image display.

As shown in FIG. 1C, the backward camera unit 200 is disposed on the mirror display unit 100, for example, may be integrated into the mirror display unit 100, or disposed on an upper part, a lower part, or other positions of the mirror display unit 100. As shown in FIG. 1C and FIG. 1D, the mirror 105 generates a first image 120 via reflection, and the backward camera unit 200 captures a second image 220. The area of the first image 120 is within the area of the second image 220. Preferably, the mirror 105 is a rear-view mirror in a vehicle, and the mirror 105 reflects a corresponding mirror image, namely, the first image 120, depending on a viewing angle of the driver. The backward camera unit 200 is a camera disposed backward in a vehicle and is configured to capture a photographic image, namely, the second image 220, taken from a position at or near the rear-view mirror. The area of the captured photographic image is wider than the area of the image reflected by the mirror, so that the area of the first image 120 is within the area of the second image 220. In other words, content of the first image 120 all has corresponding image content in the second image 220. Therefore, a portion of the second image 220 can be box-selected or extracted to obtain a same area and same content of the first image 120 without considering a difference in the viewing angle.

The image processing module 160 determines a relative position of the driver based on the content of the second image 220. In an embodiment, the relative position of the driver includes the viewing angle of the driver and a distance of the driver. As shown in FIG. 1C and FIG. 1D, from the position of the driver in the second image 220, the relative position of the driver, such as a relative viewing angle and a distance between the driver and the mirror, can be determined. As such, the area of the first image 120 may be calculated in a manner such as projective geometry. Therefore, an area correspondence between the second image 220 and the first image 120, for example, a coordinate range of a specific area 120' in the second image 220 to which the first image corresponds or a corresponding proportional relationship of image sizes, can be obtained. The display image 222 in FIG. 1B is then generated from the second image 220 on the display surface 185 based on the area correspondence.

In this embodiment, since the second image 220 generated by the backward camera 200 can be used for determining the position of the driver, the backward camera 200 has a function of a reference data detection module 600 in the subsequent embodiments. The second image 220 functions as reference data 605 in the subsequent embodiments.

The switch detection unit 170 is coupled to the control module 150 of the mirror display unit 100 and generates a switch command when the switch detection unit 170 detects a switch action. In an embodiment, the switch action is a manipulation gesture. When a specific manipulation gesture is detected, a switch command is generated to display the display image 222 on the mirror display unit 100. Since the display image 222 is generated based on the area correspondence described above, the area and the display scale thereof can be adjusted and set based on the area of the reflected first image 120 that the driver originally sees in the mirror 105. In this embodiment, the display image 222 may be set to have the display scale the same as that of the first image 120, to be specific, the same image object (for example, a rear car) may be displayed in the same size. When the display surface 185 has the same size as the mirror 105, the display areas of the display image 222 and the first image 120 are the same. In other words, when the reflected first image 120 is switched to the display image 222 from the camera, a driver can more quickly grasp a spatial sense of the display image 222.

Figure 1E:
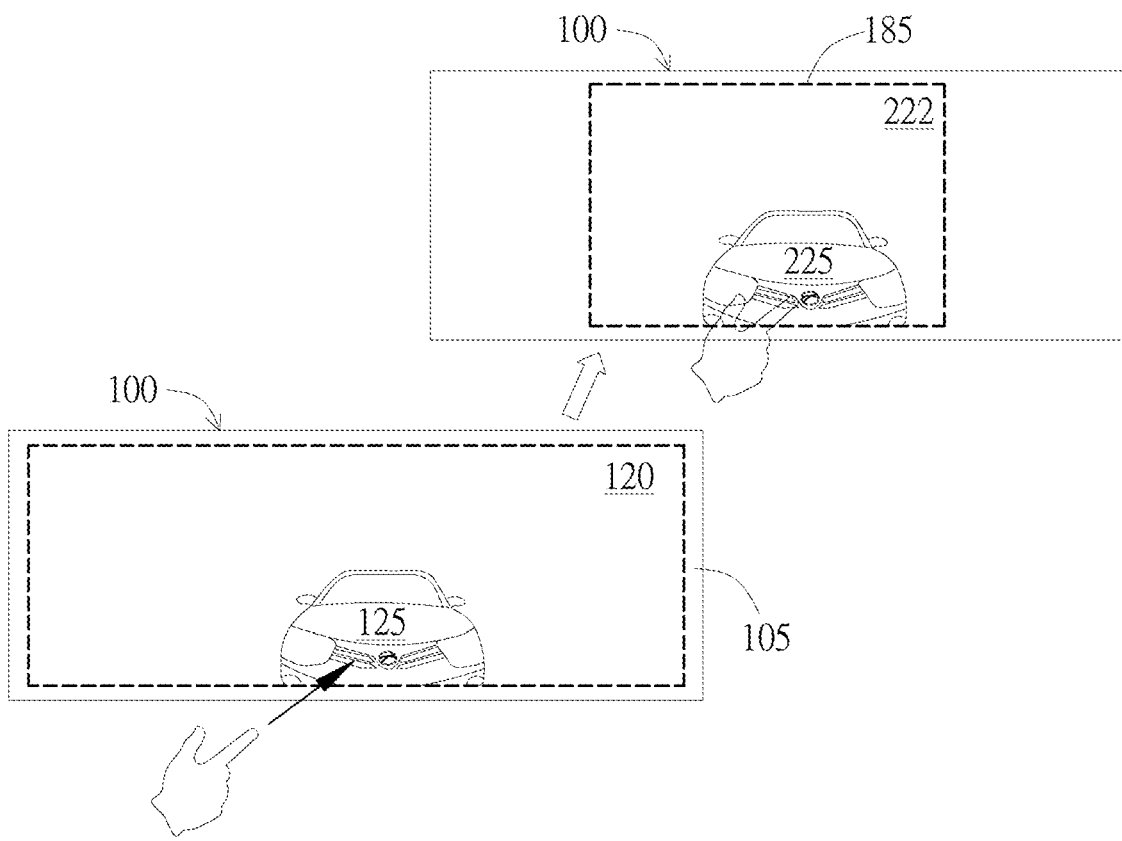
FIG. 1E is a schematic diagram of an embodiment of a control device for image display.

In an embodiment, the switch command may be a touch command, such as touching a touch circuit of the mirror display unit 100 with a finger to generate a touch command, which is transmitted to the image processing module 160. As shown in FIG. 1E, the mirror 105 of the mirror display unit 100 displays that the first image 120 generated via mirror reflection has a first object 125, and the display image 222 generated from the second image 220 based on the area correspondence has a second object 225. The second image 220 is captured and generated by the backward camera unit 200. Specifically, the first object 125 and the second object 225 are the same object in real life that are displayed in different image generation manners. The first object 125 is an object in a reflection image generated via reflection of the mirror 105, and the second object 225 is an object in a display image generated by using the photographic image captured by the backward camera unit 200. When the first object 125 in the first image 120 of the mirror 105 is touched with a finger, the switch detection unit 170 detects a switch action, the display module 180 displays the display image 222 on the mirror display unit 100, and the second object 225 is displayed at the position touched by the finger. In addition, an indicator, such as a finger or a cursor, indicating the touch position according to the touch command may be displayed on the second object 225.

In another embodiment, when the mirror display unit 100 displays the display image 222, the display image 222 is operated by a specific manipulation gesture, and operations of zooming in, zooming out, moving and the like of the display image 222 are performed, so that details of pictures with different field depths, angles and directions are captured. The driver may further determine and read a particular object in the display image 222 by manipulating the display image 222 to determine a rear vehicle condition.

Figure 2:
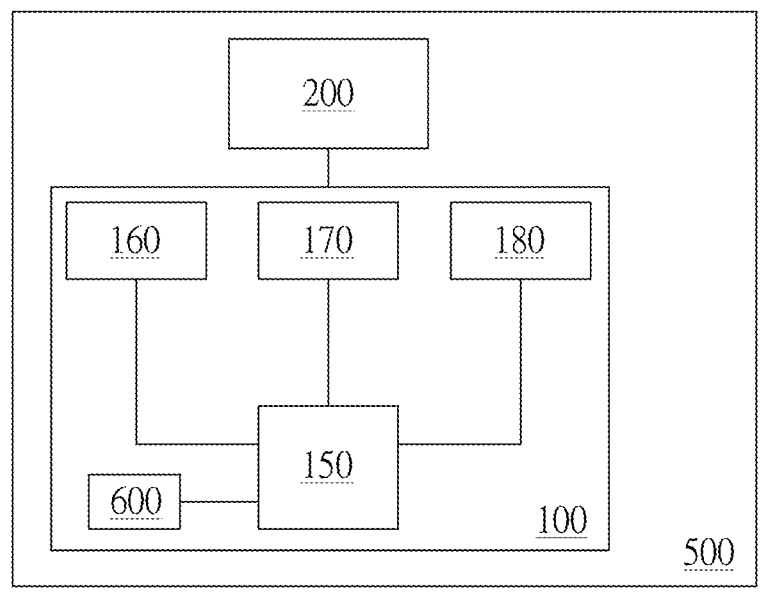
FIG. 2 is a system block diagram of an embodiment of a control device for image display.

FIG. 2 is a system block diagram of an embodiment of a control device for image display. As shown in FIG. 2, a reference data detection module 600 is provided in this embodiment to generate reference data. The image processing module 160 determines the area correspondence between the second image 220 and the first image 120 according to the reference data, and generates the display image 222 from the second image 220 based on the area correspondence.

Figure 3:
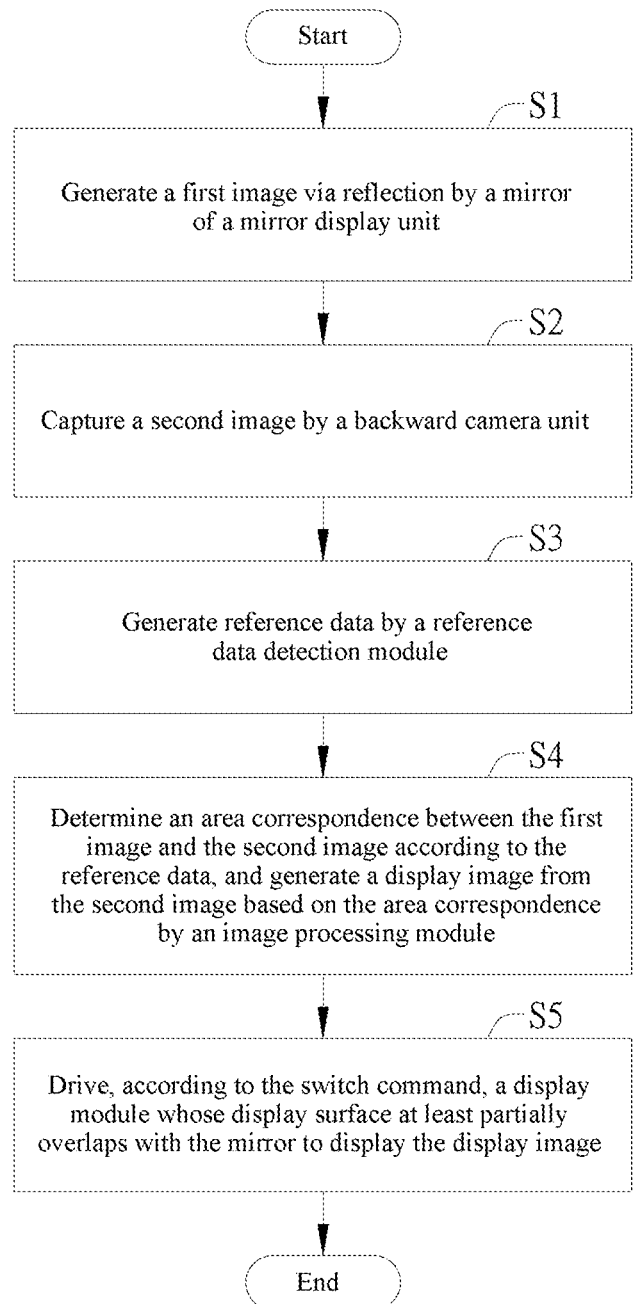
FIG. 3 is a flowchart of a control method for image display.

FIG. 3 is a flowchart of a control method for image display. The method shown in FIG. 3 may be used in combination with the device shown in FIG. 1 or FIG. 2. As shown in FIG. 3, the control method for image display includes the following steps: (S1) generating a first image 120 via reflection by a mirror 105 of a mirror display unit 110; (S2) capturing a second image 220 by a backward camera unit 200; (S3) generating reference data by a reference data detection module 600; (S4) determining an area correspondence between the second image 220 and the first image 120 according to the reference data, and generating a display image 222 from the second image 220 based on the area correspondence by an image processing module 120; and (S5) turning on, according to the switch command, a display module 180 whose display surface at least partially overlaps with the mirror 105 to display the display image 222. In addition to the foregoing embodiments, for specific implementations, further refer to the following embodiments.

Figure 4:
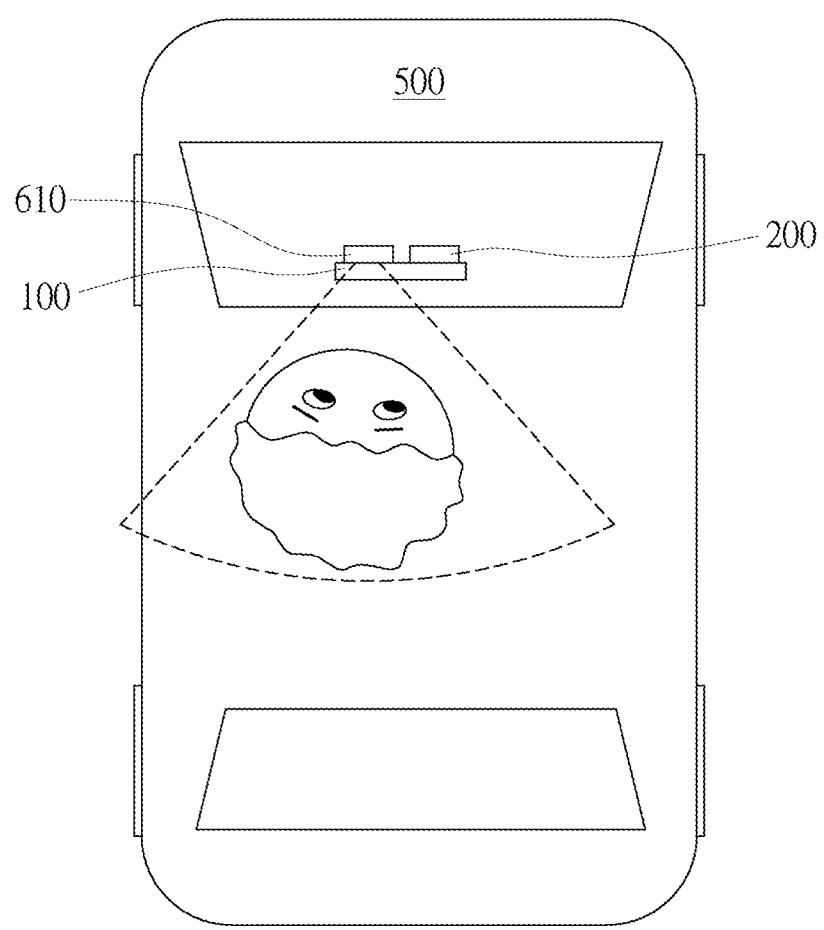
FIG. 4 is a schematic diagram of an embodiment of a control device for image display.

FIG. 4 is a schematic diagram of an embodiment of a control device for image display. In the embodiment shown in FIG. 4, the reference data detection module 600 includes an eye detection unit 610, which is configured to detect an eye position of a driver as the reference data. The image processing module 160 generates a relative position of a driver according to the reference data, determines the area of the first image 120 based on the relative position of the driver, and generates an area correspondence between the first image 120 and the second image 220 as described in the foregoing embodiments. In this embodiment, the eye detection unit 610 is a camera capable of detecting an eye position and is disposed on the mirror display unit 100, for example, may be integrated into the mirror display unit 100, or disposed on an upper part, a lower part, or other positions of the mirror display unit 100. The eye detection unit 610 may be disposed separately from the backward camera unit 200 or may be integrated with the backward camera unit 200. In another embodiment, the eye detection unit 610 may be another type of sensor capable of detecting an eye position.

Figure 5A:
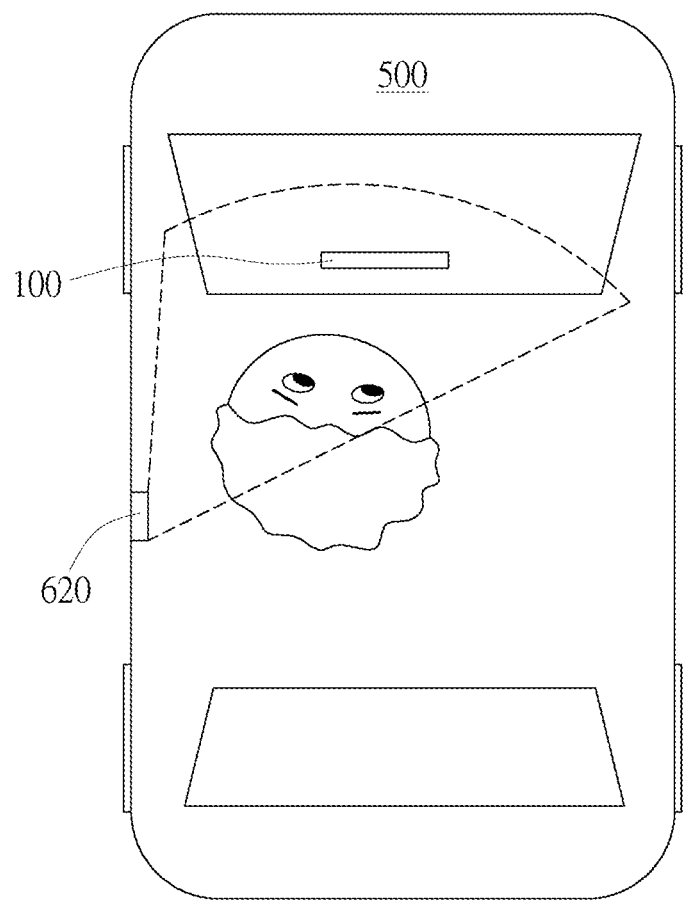
FIG. 5A is a schematic diagram of an embodiment of a control device for image display.
Figure 5B:
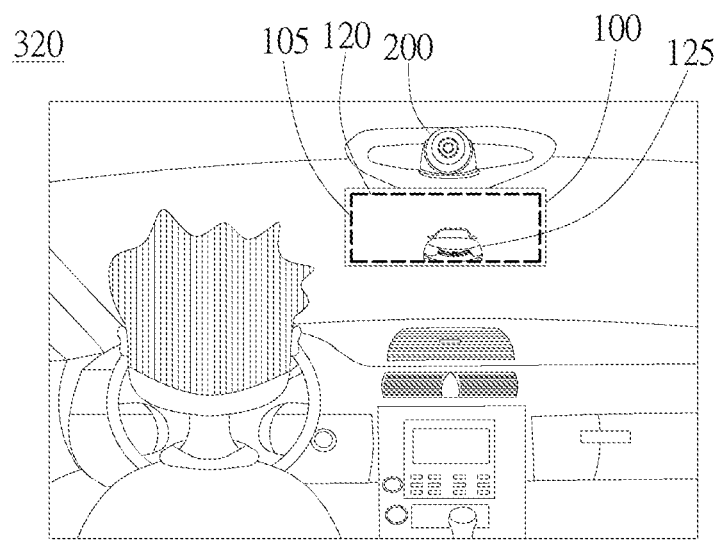
FIG. 5B is a schematic diagram of an embodiment of a control device for image display.

FIG. 5A and FIG. 5B are schematic diagrams of another embodiment of a control device for image display. As shown in FIG. 5A and FIG. 5B, the reference data detection module 600 includes a driver-side camera unit 620. The driver-side camera unit 620 is preferably disposed on the other side of the driver or the driver's seat relative to the mirror display unit 100, to capture a third image 320 of a viewing angle of the driver as the reference data. Preferably, the image having a viewing angle of the driver indicates that the viewing angle thereof is equal to or close to (for example, a difference is within plus or minus 30 degrees) the viewing angle at the position of the driver. In this embodiment, the position of the driver or the driver's seat may be captured in the third image 320. Based on the captured position of the driver in the third image 320, the relative position of the driver, such as a viewing angle at which the driver actually observes the mirror display unit 100 and a distance of the driver, can be determined. Then, the area of the first image may be calculated based on the relative position of the driver, and an area correspondence between the second image 220 and the first image 120 is obtained.

Figure 6A:
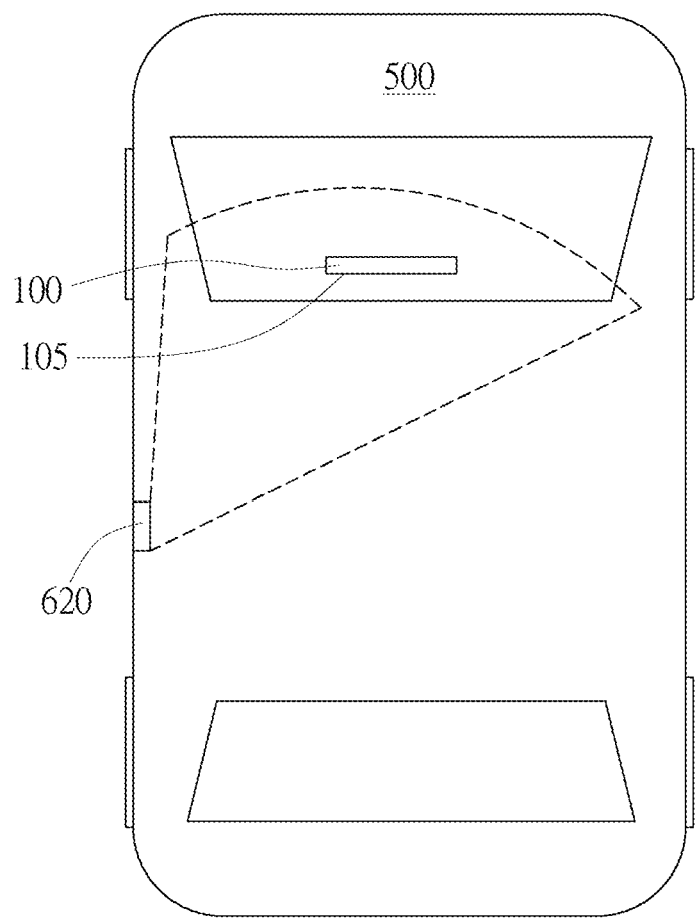
FIG. 6A is a schematic diagram of an embodiment of a control device for image display.
Figure 6B:
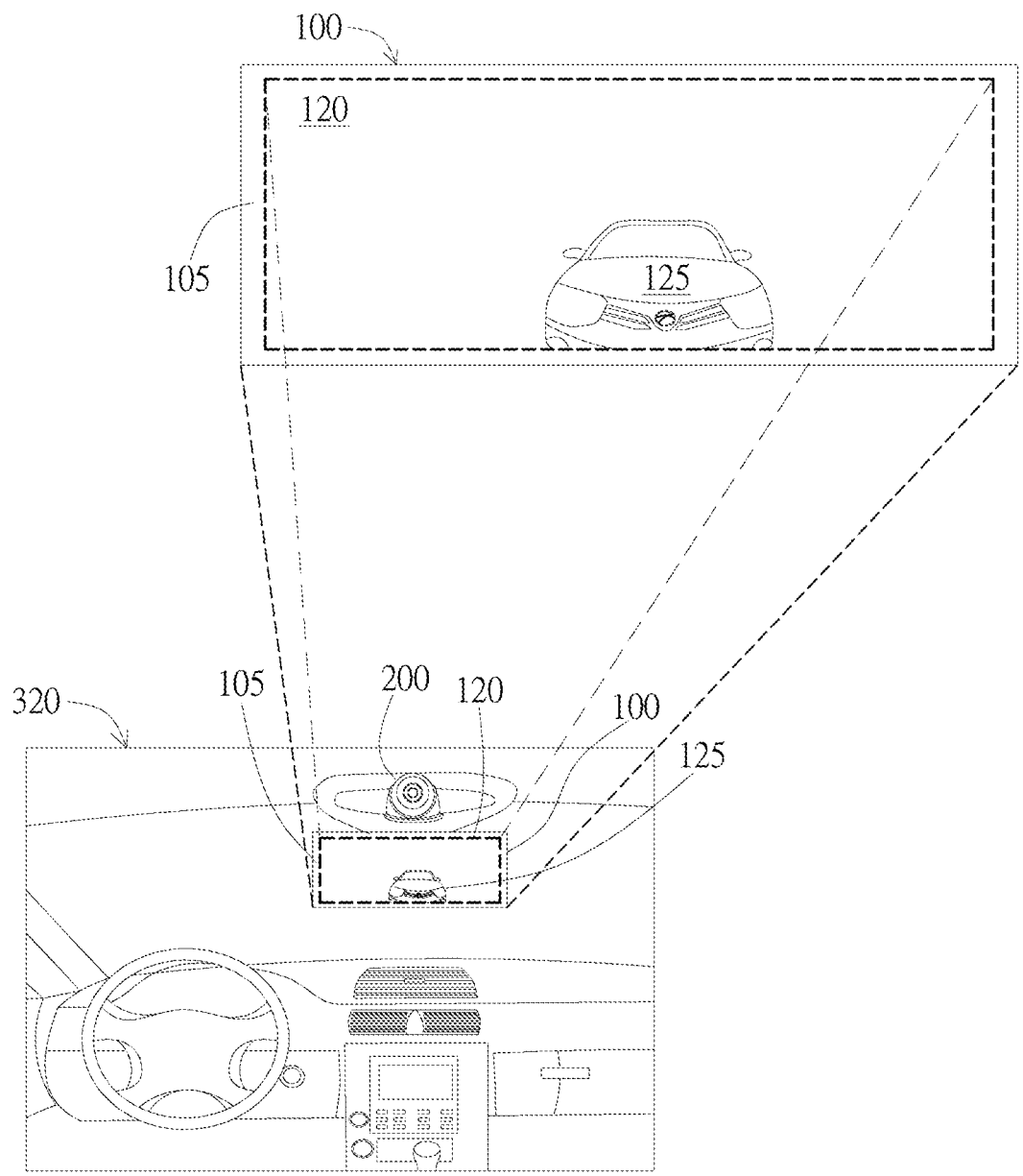
FIG. 6B is a schematic diagram of an embodiment of a control device for image display.

FIG. 6A and FIG. 6B are schematic diagrams of an embodiment of a control device for image display. As shown in FIG. 6A and FIG. 6B, the reference data detection module 600 includes a driver-side camera unit 620 for capturing a third image 320 of a viewing angle of a driver as the reference data. In this embodiment, in addition to being disposed on the other side of the driver or the driver's seat relative to the mirror, the driver-side camera unit 620 may be disposed on the driver's seat or the driver's wearable devices such as glasses. As shown in FIG. 6A and FIG. 6B, the mirror 105 is within the area of the third image 320. That is, a portion of the mirror 105 may be displayed in the third image 320 so that image content generated via reflection of the mirror 105 may be viewed. The image processing module 160 determines an image within the area of a mirror in the third image 320, that is, the area of the first image can be determined in an image analysis manner, so as to generate an area correspondence.

Figure 7:
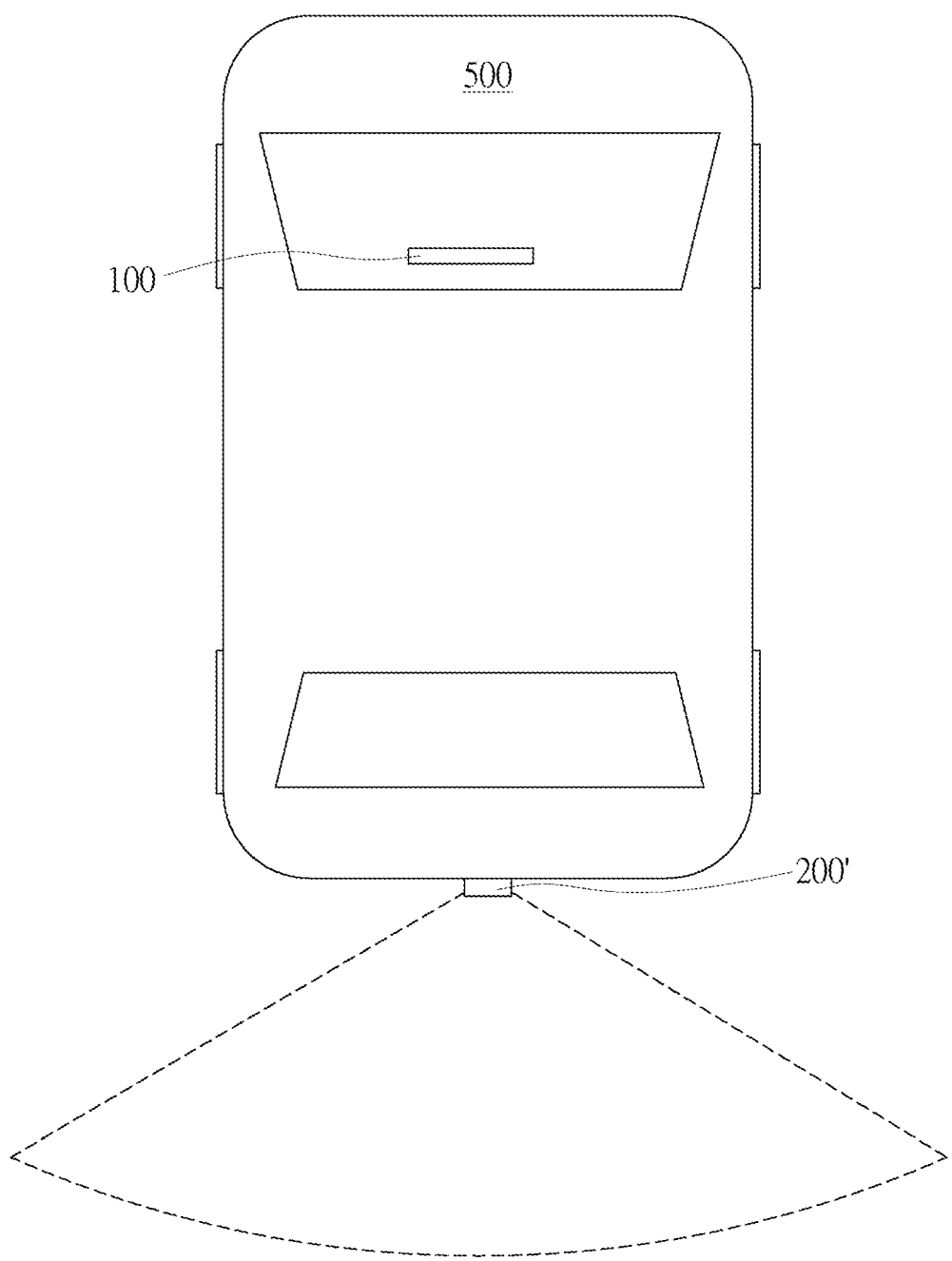
FIG. 7 is a schematic diagram of an embodiment of a control device for image display.

FIG. 7 is a schematic diagram of an embodiment of a control device for image display. As shown in FIG. 7, a backward camera unit 200' may be disposed behind the vehicle to capture a rear image of the vehicle as the second image. The detection unit 610 in FIG. 4 may be configured to detect an eye position of the driver as the reference data, or the driver-side camera unit 620 in FIG. 5A may be configured to capture the third image 320 of the viewing angle of the driver as the reference data, to generate the area correspondence.

Figure 8:
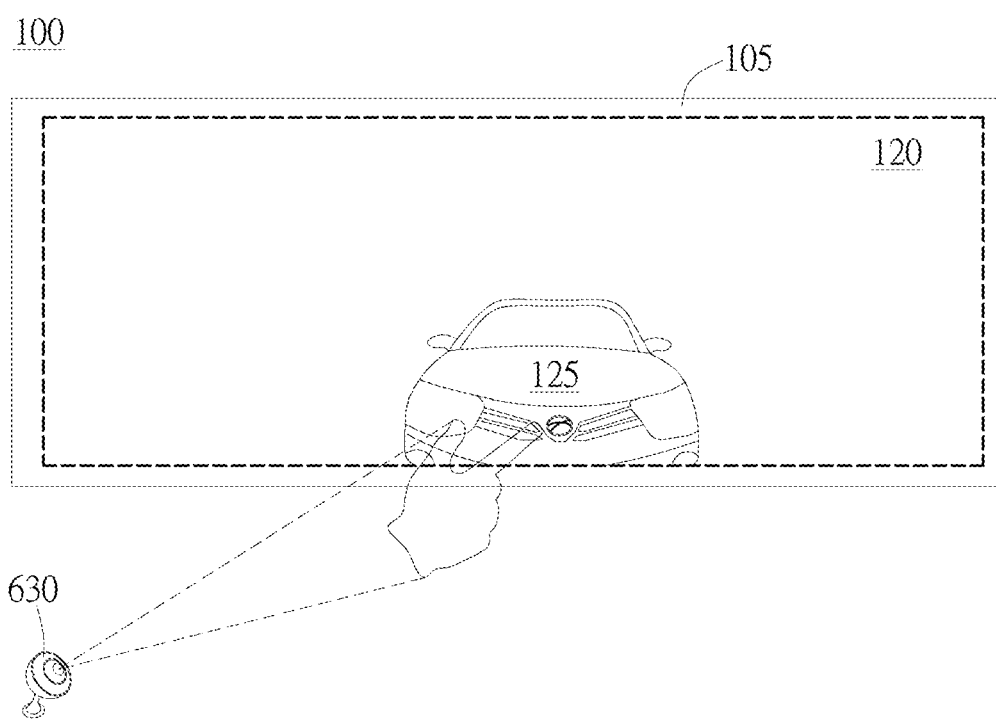
FIG. 8 is a schematic diagram of an embodiment of a control device for image display.

FIG. 8 is a schematic diagram of an embodiment of a control device for image display. As shown in FIG. 8, the reference data detection module 600 includes a camera unit 630. The camera unit 630 and the driver-side camera unit 620 may be disposed separately or be integrated. When a finger touches the first object 125 in the first image 120 of the mirror 105, the camera unit 630 captures an image of the finger and the mirror 105, and the switch detection unit 170 generates a switch command based on the determination that the switch action is detected. The image processing module 160 determines a position of the first object 125 based on a position touched by the finger (namely, a position at which the switch command is generated). In this case, switching causes the display module 180 to display the display image 222, and the second object 225 corresponding to the first object 125 is displayed at the position touched by the finger.

According to the present invention, a driver can integrate a mirror image of the rear-view mirror and a photographic image of a picture captured by the camera so as to manipulate gestures to switch between the mirror image and the photographic image. Furthermore, a specific object in the mirror image is touched to convert the mirror image into the photographic image, and the same specific object in the photographic image is further subject to operations of zooming in, zooming out, moving and the like so as to rapidly determine the rear vehicle condition.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A control device for image display, disposed on a vehicle, comprising:
 a mirror display unit, comprising:
  a mirror generating a first image via reflection;

a display module having a display surface, wherein the display surface partially overlaps with the mirror; and a switch detection unit coupled to a control module of the mirror display unit;

a backward camera unit disposed on the mirror display unit and configured to capture a second image, wherein the area of the first image is within the area of the second image; and an image processing module determining a relative position of a driver based on content of the second image, determining an area correspondence between the first image and the second image based on the relative position of the driver, and generating a display image from the second image based on the area correspondence, wherein the first image has a first object, and when the first object in the first image of the mirror is touched, the switch detection unit detects a switch action and generates a switch command;

wherein the display module displays the display image when receiving the switch command; and wherein the display image has a second object, the first object and the second object are the same object, the switch command is a touch command, and when the switch action is detected to generate the touch command, the display module displays the display image and the second object is touched.

2. The control device for image display according to claim 1, wherein the relative position of the driver comprises a viewing angle of the driver and a distance of the driver.

3. A control device for image display, disposed on a vehicle, comprising:
a mirror display unit, comprising:
a mirror generating a first image via reflection;
a display module having a display surface, wherein the display surface partially overlaps with the mirror; and
a switch detection unit coupled to a control module of the mirror display unit,
a backward camera unit capturing a second image, wherein the area of the first image is within the area of the second image;
a reference data detection module generating a reference data and comprising a camera unit; and
an image processing module determining an area correspondence between the first image and the second image according to the reference data and generating a display image from the second image based on the area correspondence,
wherein the first image has a first object, and when the first object in the first image of the mirror is touched, the switch detection unit detects a switch action and generates a switch command;
wherein the display module displays the display image when receiving the switch command; and
wherein the switch command is a command for touching the mirror with a finger, the display image has a second object, the first object and the second object are the same object, and when the finger touches the first object in the first image of the mirror, the camera unit captures an image of the finger and the mirror, and the image processing module further determines a position of the first object so that the display module displays the display image and the finger touches the second object.

4. The control device for image display according to claim 3, wherein the reference data detection module comprises:
an eye detection unit detecting an eye position of a driver as the reference data,
wherein the image processing module generates a relative position of the driver according to the reference data, and generates the area correspondence based on the relative position of the driver.

5. The control device for image display according to claim 3, wherein the reference data detection module comprises:
a driver-side camera unit capturing a third image of a viewing angle of a driver as the reference data,
wherein the image processing module generates a relative position of the driver according to the reference data, and generates the area correspondence based on the relative position of the driver.

6. The control device for image display according to claim 3, wherein the reference data detection module comprises:
a driver-side camera unit capturing a third image of a viewing angle of a driver as the reference data, the mirror being within the area of the third image,
wherein the image processing module determines an image within the area of the mirror in the third image to generate the area correspondence.

7. A control method for image display, comprising:
A) generating a first image via reflection by a mirror of a mirror display unit;
B) capturing a second image by a backward camera unit;
C) generating a reference data by a reference data detection module;
D) determining an area correspondence between the first image and the second image according to the reference data, and generating a display image from the second image based on the area correspondence by an image processing module; and
E) turning on a display module whose display surface partially overlaps with the mirror to display the display image according to a switch command generated by a switch detection unit of the mirror display unit when a first object in the first image of the mirror is touched and the switch detection unit detects a switch action, and displaying the display image by the display module and a second object in the display image is touched when the switch action is detected to generate a touch command as the switch command, wherein the first object and the second object are the same object.

8. The control method for image display according to claim 7, wherein the step C) comprises:
determining a relative position of a driver based on content of the second image as the reference data by the image processing module; and
generating the area correspondence based on the relative position of the driver.

9. The control method for image display according to claim 7, wherein the step C) comprises:
detecting an eye position of a driver as the reference data by an eye detection unit; and
generating a relative position of the driver according to the reference data, and generating the area correspondence based on the relative position of the driver by the image processing module.

10. The control method for image display according to claim 7, wherein the step C) comprises:
capturing a third image of a viewing angle of a driver as the reference data by a driver-side camera unit; and
generating a relative position of the driver according to the reference data, and generating the area correspondence based on the relative position of the driver by the image processing module.

11. The control method for image display according to claim 7, wherein the step C) comprises:
- capturing a third image of a viewing angle of a driver as the reference data by a driver-side camera unit, the mirror being within the area of the third image; and
- determining an image within the area of the mirror in the third image by the image processing module to generate the area correspondence.

\* \* \* \* \*